United States Patent
Komori et al.

(10) Patent No.: US 8,506,663 B2
(45) Date of Patent: Aug. 13, 2013

(54) FILTER ELEMENT AND SOOT FILTER HAVING IMPROVED THERMAL SHOCK RESISTANCE

(75) Inventors: Teruo Komori, Stuttgart (DE); Bernd Reinsch, Ludwigsburg (DE); Lars Thuener, Velbert (DE)

(73) Assignee: Robert Bosch GmbH, Stuttgart (DE)

( * ) Notice: Subject to any disclaimer, the term of this patent is extended or adjusted under 35 U.S.C. 154(b) by 381 days.

(21) Appl. No.: 11/992,469

(22) PCT Filed: Sep. 7, 2006

(86) PCT No.: PCT/EP2006/066105
§ 371 (c)(1),
(2), (4) Date: Apr. 14, 2009

(87) PCT Pub. No.: WO2007/033908
PCT Pub. Date: Mar. 29, 2007

(65) Prior Publication Data
US 2009/0217633 A1     Sep. 3, 2009

(30) Foreign Application Priority Data
Sep. 21, 2005   (DE) .......................... 10 2005 045 015

(51) Int. Cl.
*B01D 46/00*   (2006.01)

(52) U.S. Cl.
USPC .................. 55/385.3; 55/523; 55/DIG. 30

(58) Field of Classification Search
USPC ............... 55/522, 523, 524, 525, 385.3, 466; 422/177; 60/311
See application file for complete search history.

(56) References Cited

U.S. PATENT DOCUMENTS

| | | | | |
|---|---|---|---|---|
| 4,392,602 A * | 7/1983 | Darby | ............................ | 228/118 |
| 4,419,108 A * | 12/1983 | Frost et al. | ...................... | 95/286 |
| 5,346,675 A * | 9/1994 | Usui et al. | ...................... | 422/180 |
| 5,380,501 A * | 1/1995 | Hitachi et al. | ................. | 422/180 |
| 5,486,338 A * | 1/1996 | Ota et al. | ........................ | 422/179 |
| 5,863,508 A | 1/1999 | Lachman et al. | | |
| 6,368,726 B1 * | 4/2002 | Holpp et al. | ................... | 428/593 |
| 6,428,755 B1 * | 8/2002 | Rao et al. | ....................... | 422/180 |
| 6,673,466 B2 * | 1/2004 | Bruck et al. | ................... | 428/593 |
| 6,776,814 B2 * | 8/2004 | Badeau et al. | ............... | 55/385.3 |
| 6,908,595 B1 * | 6/2005 | Biel et al. | ....................... | 422/179 |
| 6,964,694 B2 * | 11/2005 | Rauchfuss et al. | ................... | 95/1 |
| 7,138,002 B2 * | 11/2006 | Hamanaka et al. | .............. | 55/523 |
| 7,393,376 B2 * | 7/2008 | Taoka et al. | ..................... | 55/523 |
| 7,429,285 B2 * | 9/2008 | Kuki et al. | ....................... | 55/523 |
| 7,465,331 B2 * | 12/2008 | Noller | .............................. | 55/523 |
| 7,491,373 B2 * | 2/2009 | Ketcham et al. | ............ | 423/213.2 |
| 7,497,889 B2 * | 3/2009 | Furukawa et al. | ............... | 55/523 |
| 7,943,096 B2 * | 5/2011 | Kurth et al. | .................... | 422/180 |
| 2004/0055265 A1 * | 3/2004 | Ohno et al. | ...................... | 55/523 |
| 2004/0071932 A1 | 4/2004 | Ishihara et al. | | |

(Continued)

FOREIGN PATENT DOCUMENTS

| | | |
|---|---|---|
| EP | 0285362 | 10/1988 |
| EP | 1293241 | 3/2003 |

(Continued)

*Primary Examiner* — Duane Smith
*Assistant Examiner* — Thomas McKenzie
(74) *Attorney, Agent, or Firm* — Kenyon & Kenyon LLP

(57) ABSTRACT

A filter element and a soot filter in which the temperature distribution over the cross-section of the filter element can be kept constant in first approximation.

5 Claims, 2 Drawing Sheets

(56) References Cited

U.S. PATENT DOCUMENTS

| | | | |
|---|---|---|---|
| 2004/0079060 A1* | 4/2004 | Alward | 55/523 |
| 2004/0134172 A1* | 7/2004 | Kumar et al. | 55/523 |
| 2004/0156761 A1* | 8/2004 | Bruck et al. | 422/179 |
| 2004/0161373 A1* | 8/2004 | Ichikawa et al. | 422/180 |
| 2005/0031514 A1* | 2/2005 | Patchett et al. | 423/239.2 |
| 2005/0186127 A1* | 8/2005 | Reck et al. | 422/180 |
| 2005/0210848 A1* | 9/2005 | Kuki et al. | 55/523 |
| 2006/0177359 A1* | 8/2006 | Sinha et al. | 422/179 |

FOREIGN PATENT DOCUMENTS

| | | |
|---|---|---|
| EP | 158181 | 5/2004 |
| EP | 1416132 | 5/2004 |
| JP | 58-45715 | 3/1983 |
| JP | 2003-126629 | 5/1993 |
| JP | 2003-514180 | 4/2003 |
| JP | 05-118211 | 5/2003 |
| JP | 2004-154768 | 6/2004 |
| WO | WO 01/34281 | 5/2001 |

* cited by examiner

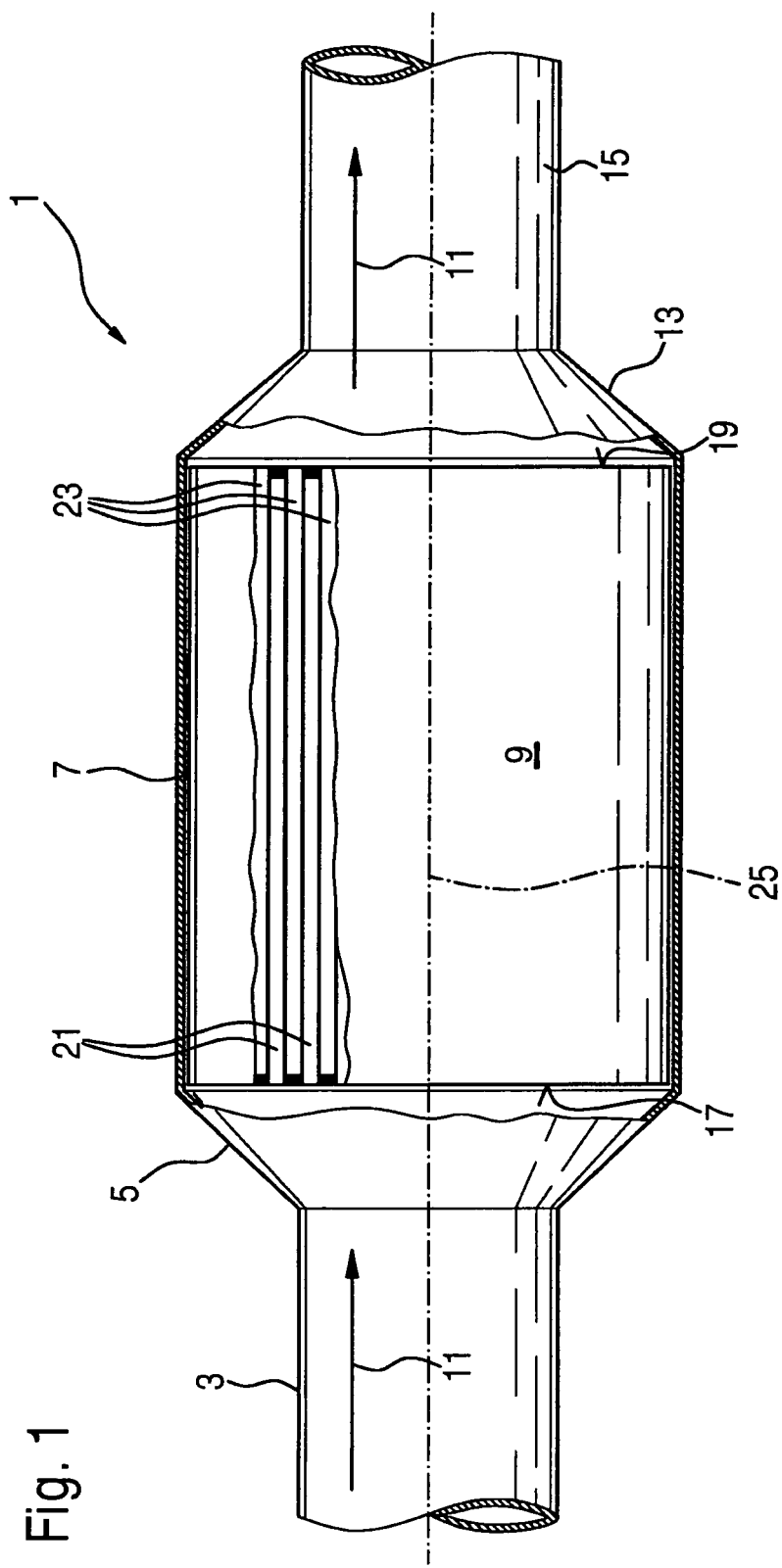

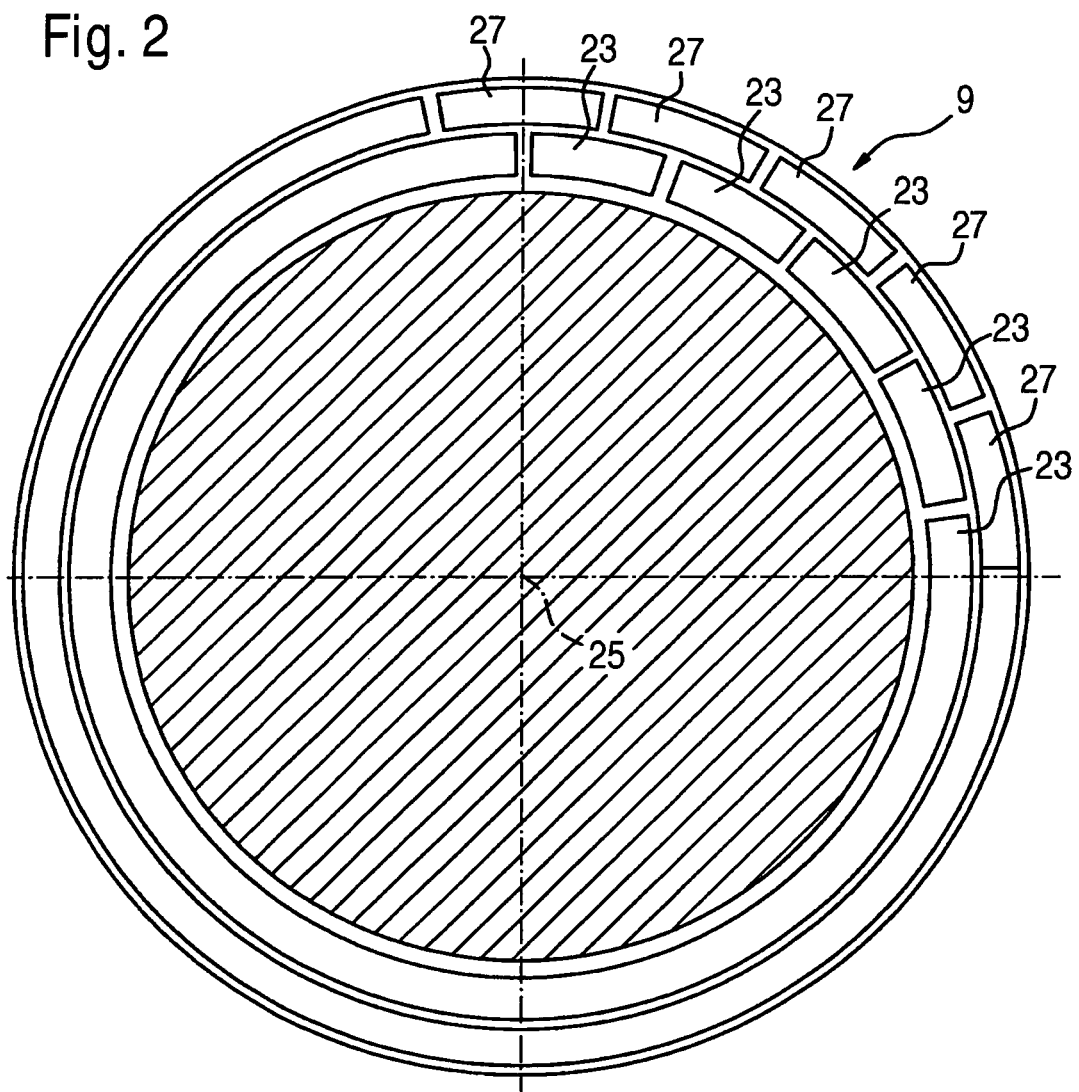

FILTER ELEMENT AND SOOT FILTER HAVING IMPROVED THERMAL SHOCK RESISTANCE

FIELD OF THE INVENTION

The present invention relates to a filter element for purifying exhaust gases of an internal combustion engine and a soot filter having a filter element. Filter elements of this type are used, for example, as soot filters for diesel engines.

BACKGROUND INFORMATION

The filter elements are often made of a ceramic material and have a plurality of inlet channels and outlet channels running parallel to each other.

Filter elements made of ceramic materials are manufactured by extrusion. This means that the blank of the filter element is a prismatic body having a plurality of channels running parallel to each other. The channels of a blank are initially open at both ends.

For the exhaust gas to be purified to flow through the walls of the filter, part of the channels is closed at the downstream end of the filter element, while another part of the channels is closed at the upstream end of the filter element. Two groups of channels are thus formed, namely the so-called inlet channels, which are closed at their downstream ends, and the so-called outlet channels, which are closed at the upstream ends of the filter element.

A flow connection exists between the inlet channels and the outlet channels only through the porous walls of the filter element, so that the exhaust gas may only flow through the filter element by flowing from the inlet channels through the walls of the filter element into the outlet channels.

In order to ensure an optimally effective operation of the filter element, a most uniform temperature distribution possible over the cross section of the filter element during the operation of the internal combustion engine is strived after.

SUMMARY

An object of the present invention is to provide a filter element for a soot filter and a soot filter in which the temperature distribution over the cross section of the filter element and consequently the operational behavior of the soot filter equipped with the filter element according to the present invention are improved and their service life is extended.

This object may be achieved according to example embodiments of the present invention in a filter element for filtering soot, in particular for filtering exhaust gases of a diesel engine, having a longitudinal axis running parallel to the main flow direction of the exhaust gas, having a plurality of inlet channels running parallel to the longitudinal axis and a plurality of outlet channels running parallel to the longitudinal axis, the inlet channels starting at an inlet face of the filter element and being closed at an outlet face of the filter element, and the outlet channels being closed at the inlet face and ending at the outlet face, in that the channels situated outside on the filter element are closed at both ends.

Due to the blind channels according to the example embodiments of the present invention, closed at both ends on the external area of the filter element, the temperature distribution within the filter element is improved. Since these blind channels are closed on both sides, the exhaust gas does not flow through them. There is air used for heat insulation inside these channels. The heat transfer of the filter element to its cylindrical or prismatic outer area is thus strongly reduced. As a result, the temperature drop at the periphery of the filter element is also strongly reduced, so that the temperature distribution within the filter element is improved. In addition, the warm-up time of the filter element according to the present invention is shortened.

It has been found advantageous if up to five layers, preferably up to three layers, of blind channels are situated outside on the filter element. The heat transfer to the outside is thus further reduced and the temperature profile becomes more uniform.

To further improve the temperature distribution, it is furthermore proposed that a layer of outlet channels be situated within the layer or layers of blind channels.

In another advantageous embodiment of the present invention it is provided that the radial walls between two adjacent channels be offset with respect to each other. The filter element according to the present invention thus becomes more flexible in the radial direction and the thermal stresses in the radial direction are reduced. This improves the resistance of the filter element according to the present invention against rapid temperature changes which otherwise could possibly result in cracks and thus in failure of the filter element.

It has also been found advantageous if the filter element is rotationally symmetrical or centrally symmetrical with respect to its longitudinal axis.

The above-mentioned advantages may also be achieved using a soot filter having a filter element, a housing, a feed line, and an outlet line, a diffusor connecting the feed line to the housing and a cone connecting the housing to the outlet line, by using a filter element according to the present invention.

Further advantages and advantageous embodiments of the present invention are presented in the figures and the description below. All features disclosed in the figures, and their description, may be used according to the present invention either individually or in any combination.

BRIEF DESCRIPTION OF THE DRAWINGS

FIG. 1 shows a soot filter having a filter element according to an example embodiment of the present invention in a side view.

FIG. 2 shows a filter element according to the present invention in a front view.

DETAILED DESCRIPTION OF EXAMPLE EMBODIMENTS

FIG. 1 shows a soot filter 1 having a feed line 3, a diffusor 5, a housing 7, and a filter element 9 according to an example embodiment of the present invention in a partially sectioned side view.

The flow passes through soot filter 1 in the direction of arrows 11. Housing 7 is connected to a cone 13 and an outlet line 15. Filter element 9 is gas-tightly connected to the housing, so that the exhaust gas (not depicted) entering through feed line 3 must flow through filter element 9.

Filter element 9 has an inlet face 17 and an outlet face 19. A plurality of channels extending from inlet face 17 to outlet face 19 passes through filter element 19.

For the exhaust gas to be forced to flow through the walls of filter element 9, inlet channels 21 are open at inlet face 17 and closed at outlet face 19. So-called outlet channels 23 are closed at inlet face 17 and open at outlet face 19. The closures of inlet channels 21 and outlet channels 23 are shown in FIG. 1 as black areas.

The pattern shown in a partial section in FIG. 1 of one inlet channel 21, which alternates with an outlet channel 23, continues over the entire cross-section area of the filter element in a conventional manner.

FIG. 2 shows a cross section through an exemplary embodiment of a filter element 9 according to the present invention.

The exemplary embodiment shown in FIG. 2 has a circular cross section and is centrally symmetric with respect to longitudinal axis 25. Within the shaded area inside filter element 9, inlet channels 21 and outlet channels 23 (see FIG. 1) are alternatingly situated as known from the related art. For the sake of clarity, not all channels 21 and 23 are depicted in FIG. 2.

In the exemplary embodiment of FIG. 2, a layer of blind channels 27 is situated on the outer diameter of filter element 9. Also for the sake of clarity, only some blind channels 27 are depicted as examples, specifically over a circumference angle of approximately 90° in the first quadrant. Blind channels 27 are provided also in the other quadrants.

The position of blind channels 27 is used as thermal insulation against the environment, since air is a poor conductor of heat. Heat transfer to the outside is further reduced and the temperature is raised in the external area of filter element 9 due to the jacket of blind channels 27 on the periphery of filter element 9. This results in the temperature becoming more uniform over the cross section of filter element 9 as described above.

A plurality of concentric layers (not depicted) of blind channels 27 may also be provided to further improve the thermal insulation and consequently also the temperature profile inside filter element 9.

In the exemplary embodiment depicted in FIG. 2, a layer of outlet channels 23 is situated between the layer of blind channels 27 and the shaded area. This results in further advantages regarding the operating behavior and service life of filter element 9 according to the present invention.

Blind channels 27 may have a cross section different from that of inlet channels 21 or outlet channels 23. It may, however, also be advantageous if all channels 21, 23, and 27 have the same cross section.

The arrangement according to the present invention of different inlet channels 21, outlet channels 23, and/or blind channels 27 on the periphery of filter element 9 is not limited to cylindrical filter elements 9, but may also be applicable to filter element 9 having a square or rectangular cross section. Thus, for example, inlet channels 21, outlet channels 23, and/or blind channels 27 may have hexagonal or cross shapes.

What is claimed is:

1. A filter element for filtering exhaust gases of a diesel engine, the filter element having a longitudinal axis running parallel to a main flow direction of the exhaust gas, a plurality of channels including a plurality of inlet channels running parallel to the longitudinal axis and a plurality of outlet channels running parallel to the longitudinal axis, the inlet channels starting at an inlet face of the filter element and being closed at an outlet face of the filter element, and the outlet channels being closed at the inlet face and ending at the outlet face, the filter element further having blind channels formed integrally with the filter element and situated outside on the filter element, the blind channels being closed at both ends and running parallel to the longitudinal axis, wherein radial walls between at least one of two adjacent channels and blind channels are offset with respect to each other; and wherein the filter element is configured to be gas-tightly connected to an inner surface of a housing.

2. The filter element as recited in claim 1, wherein up to five layers of blind channels closed at both ends are provided at an outer diameter of the filter element.

3. The filter element as recited in claim 1, wherein a layer of the outlet channels is situated within a layer of the blind channels situated farthest inside.

4. The filter element as recited in claim 1, wherein the filter element is rotationally symmetric or centrally symmetric with respect to the longitudinal axis.

5. A soot filter comprising:
a filter element for filtering exhaust gases of a diesel engine, the filter element having a longitudinal axis running parallel to a main flow direction of the exhaust gas, a plurality of channels including a plurality of inlet channels running parallel to the longitudinal axis and a plurality of outlet channels running parallel to the longitudinal axis, the inlet channels starting at an inlet face of the filter element and being closed at an outlet face of the filter element, and the outlet channels being closed at the inlet face and ending at the outlet face, the filter element further having blind channels formed integrally with the filter element and situated outside on the filter element, the blind channels being closed at both ends and running parallel to the longitudinal axis, radial walls between at least one of two adjacent channels and blind channels being offset with respect to each other;
a housing, the filter element being situated in and gas-tightly connected to an inner surface of the housing;
a feed line;
an outlet line;
a diffusor connecting the feed line to the housing; and
a cone connecting the housing to the outlet line.

* * * * *

UNITED STATES PATENT AND TRADEMARK OFFICE
CERTIFICATE OF CORRECTION

PATENT NO. : 8,506,663 B2  Page 1 of 1
APPLICATION NO. : 11/992469
DATED : August 13, 2013
INVENTOR(S) : Komori et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 866 days.

Signed and Sealed this
Fifteenth Day of September, 2015

Michelle K. Lee
*Director of the United States Patent and Trademark Office*